(12) United States Patent
Ahluwalia

(10) Patent No.: US 10,764,793 B2
(45) Date of Patent: *Sep. 1, 2020

(54) HANDOVER HANDLING

(71) Applicant: NEC Corporation, Tokyo (JP)

(72) Inventor: Jagdeep Singh Ahluwalia, Sutton (GB)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,845

(22) Filed: Aug. 15, 2017

(65) Prior Publication Data

US 2018/0014228 A1 Jan. 11, 2018

Related U.S. Application Data

(63) Continuation of application No. 14/643,642, filed on Mar. 10, 2015, now Pat. No. 9,894,567, which is a
(Continued)

(30) Foreign Application Priority Data

May 1, 2007 (GB) .................................. 0708455.1

(51) Int. Cl.
*H04W 36/00* (2009.01)
*H04L 1/18* (2006.01)
(Continued)

(52) U.S. Cl.
CPC ....... *H04W 36/0033* (2013.01); *H04L 1/1671* (2013.01); *H04L 1/1877* (2013.01);
(Continued)

(58) Field of Classification Search
CPC ..... H04L 1/1671; H04L 47/34; H04L 49/552; H04W 36/0033; H04W 36/02; H04W 36/023
See application file for complete search history.

(56) References Cited

U.S. PATENT DOCUMENTS 5,940,371 A 8/1999 Mitts et al.
6,717,927 B2 4/2004 Chao et al.
(Continued)

FOREIGN PATENT DOCUMENTS

| CN | 1669350 A | 9/2005 |
|---|---|---|
| EP | 1343267 A3 | 8/2005 |

(Continued)

OTHER PUBLICATIONS

Siemens, SDU Forwarding during intra-lte hand over, Apr. 2006, 3GPP, R3-060775, pp. 1-3.*
(Continued)

*Primary Examiner* — Steven H Nguyen
(74) *Attorney, Agent, or Firm* — Wilmer Cutler Pickering Hale and Dorr LLP

(57) ABSTRACT

A system is proposed to provide handover in a mobile telecommunications environment, particularly applicable to 3GPP networks, which does not increase signalling overhead but minimises user data loss during handover. In the modified system, PDCP SDUs with Sequence numbers are buffered and retransmitted as necessary. At the time of handover, SDUs not received by the user device are forwarded to the target base station for forward transmission to the UE. The handover procedure is designed to minimise packet loss whilst keeping to a minimum the duplication of packet transmission over the air interface.

16 Claims, 6 Drawing Sheets

Related U.S. Application Data continuation of application No. 13/543,402, filed on Jul. 6, 2012, now abandoned, which is a continuation of application No. 12/451,166, filed as application No. PCT/JP2008/058589 on Apr. 30, 2008, now Pat. No. 9,001,781.

(51) Int. Cl.

| | | |
|---|---|---|
| H04W 36/02 | (2009.01) | |
| H04L 12/801 | (2013.01) | |
| H04L 1/16 | (2006.01) | |
| H04L 12/939 | (2013.01) | |
| H04L 1/00 | (2006.01) | |

(52) U.S. Cl.
CPC ............ *H04L 47/34* (2013.01); *H04L 49/552* (2013.01); *H04W 36/02* (2013.01); *H04W 36/023* (2013.01); *H04L 2001/0097* (2013.01)

(56) References Cited

U.S. PATENT DOCUMENTS

| | | | |
|---|---|---|---|
| 6,930,980 B2 | 8/2005 | Tourunen | |
| 7,321,589 B2 | 1/2008 | Lohr et al. | |
| 7,327,734 B2 | 2/2008 | Yi et al. | |
| 7,512,099 B2 | 3/2009 | Ameigeiras et al. | |
| 7,512,104 B2 | 3/2009 | Bjelland et al. | |
| 7,706,405 B2 | 4/2010 | Terry et al. | |
| 7,756,135 B2 | 7/2010 | Yi et al. | |
| 7,848,752 B2 | 12/2010 | Kim et al. | |
| 8,254,935 B2 | 8/2012 | Tomita et al. | |
| 8,265,628 B2 | 9/2012 | Lindstrom et al. | |
| 8,406,767 B2 | 3/2013 | Chun et al. | |
| 9,001,781 B2 * | 4/2015 | Ahluwalia | H04W 36/02 370/331 |
| 9,894,576 B2 | 2/2018 | Li et al. | |
| 2001/0030965 A1 | 10/2001 | Tourunen et al. | |
| 2001/0043579 A1 | 11/2001 | Tourunen et al. | |
| 2002/0001298 A1 | 1/2002 | Tourunen et al. | |
| 2002/0094814 A1 | 7/2002 | Wigell et al. | |
| 2003/0007490 A1 | 1/2003 | Yi et al. | |
| 2003/0012179 A1 | 1/2003 | Yano et al. | |
| 2003/0022654 A1 | 1/2003 | Kakani et al. | |
| 2003/0157927 A1 | 8/2003 | Yi et al. | |
| 2003/0165161 A1 | 9/2003 | Kalliokulju et al. | |
| 2003/0169725 A1 | 9/2003 | Ahmavaara et al. | |
| 2003/0176187 A1 * | 9/2003 | Menzel | H04W 36/18 455/432.1 |
| 2003/0189909 A1 | 10/2003 | Chao et al. | |
| 2003/0206534 A1 | 11/2003 | Wu | |
| 2003/0210676 A1 | 11/2003 | Wu | |
| 2004/0052229 A1 | 3/2004 | Terry et al. | |
| 2004/0151154 A1 | 8/2004 | Wu et al. | |
| 2004/0165554 A1 | 8/2004 | Chao et al. | |
| 2005/0094586 A1 | 5/2005 | Zhang et al. | |
| 2005/0141477 A1 | 6/2005 | Tomita et al. | |
| 2005/0237976 A1 | 10/2005 | Walldeen et al. | |
| 2006/0098574 A1 | 5/2006 | Yi et al. | |
| 2006/0126567 A1 | 6/2006 | Chao et al. | |
| 2006/0153137 A1 | 7/2006 | Chao et al. | |
| 2006/0256745 A1 | 11/2006 | Chao et al. | |
| 2007/0047452 A1 | 3/2007 | Lohr et al. | |
| 2007/0171857 A1 | 7/2007 | Wang et al. | |
| 2007/0275746 A1 | 11/2007 | Bitran | |
| 2007/0286125 A1 * | 12/2007 | Lee | H04W 36/02 370/331 |
| 2007/0291695 A1 * | 12/2007 | Sammour | H04W 36/02 370/331 |
| 2008/0019320 A1 | 1/2008 | Phan et al. | |
| 2008/0119189 A1 | 5/2008 | Chang et al. | |
| 2008/0205394 A1 | 8/2008 | Deshpande et al. | |
| 2008/0254800 A1 | 10/2008 | Chun et al. | |
| 2008/0268850 A1 * | 10/2008 | Narasimha | H04W 36/0072 455/437 |
| 2008/0298322 A1 | 12/2008 | Chun et al. | |
| 2009/0103478 A1 | 4/2009 | Sammour et al. | |
| 2010/0067483 A1 | 3/2010 | Ahluwalia | |
| 2010/0091709 A1 | 4/2010 | Yi et al. | |
| 2010/0135249 A1 | 6/2010 | Meyer et al. | |
| 2010/0227614 A1 | 9/2010 | Chun et al. | |
| 2010/0232391 A1 | 9/2010 | Olsson et al. | |
| 2012/0170550 A1 | 7/2012 | Chao et al. | |
| 2014/0362826 A1 | 12/2014 | Chao et al. | |
| 2015/0023370 A1 | 1/2015 | Sammour et al. | |
| 2016/0112912 A1 | 4/2016 | Chao et al. | |
| 2017/0237837 A1 | 8/2017 | Sammour et al. | |

FOREIGN PATENT DOCUMENTS

| | | | |
|---|---|---|---|
| EP | 1686736 A1 | 8/2006 | |
| JP | 2003-111148 A | 4/2003 | |
| JP | 2003-283592 A | 10/2003 | |
| JP | 2003-530764 A | 10/2003 | |
| JP | 2003-333671 A | 11/2003 | |
| JP | 2010-525618 A | 7/2010 | |
| JP | 2010-525737 A | 7/2010 | |
| WO | WO-02/15524 A1 | 2/2002 | |
| WO | WO-2008/023814 A2 | 2/2008 | |
| WO | WO-2009/045945 A2 | 4/2009 | |

OTHER PUBLICATIONS

Chinese Office Action Issued by the Chinese Patent Office for Chinese Application No. 201310026011.2, dated Feb. 12, 2015 (8 pages).
European Communication Pursuant to Article 94(3) EPC issued in corresponding European Patent Application No. 08752475.7, dated Sep. 16, 2016, 7 pages.
European Search Report corresponding to European Application No. 12158818.0, dated Jun. 1, 2012, 10 pages.
Inter Digital Communications Corporation: "R2-062800 Sequence Numbering & Reuse of PDCP SN", Oct. 9-13, 2006, Seoul Korea, 3GPP TSG RAN WG2 #55, pp. 1-6, XP002491406.
Inter Digital Communication, Intra-LTE Handover Contest Transfer and Data Forwarding, May 2006, 3GGPP TSG RAN3#52, R3-060751, pp. 1-11.
Japanese Office Action corresponding to Japanese Patent Application No. 2012-12497, dated Sep. 11, 2013, 2 pages.
Japanese Office Action dated Apr. 4, 2012, with partial English language translation (4 pages).
Japanese Office Action issued by the Japan Patent Office for Application No. 2015-20079 dated Jul. 6, 2016 (12 pages).
Japanese Office Action Issued by the Japanese Patent Office for Japanese Application No. 2014-092445 dated Feb. 4, 2015 (4 pages).
Korean Office Action corresponding to Korean Patent Application No. 10-2011-7016285, dated Apr. 4, 2013, 3 pages.
LG Electronics, Inc. "L2 Architecture for LTE" 3GPP TSG-RAN WG2 #57bis, R2-071491, St. Julian's, Malta, Mar. 26-30, 2007, pp. 1-4.
NEC: "R3-0601088 Lossless Intra-LTE Handover", Aug. 28-Sep. 1, 2006, Tallin, Estonia, 3GPP TSG RAN3 #53, pp. 1-7, XP002491407.
Nokia: "R2-062754 PDCP/RLC/MAC PDU structure", Oct. 9-13, 2006, Seoul, Korea, 3GPP TSG-RAN WG2 Meeting #55, pp. 1-9, XP002491405.
NTT DoCoMo, Inc. "E-mail discussion on data handling at handover", 3GPP TSG RAN WG2 #57bis, Tdoc R2-071294, St. Julian's, Malta, Mar. 26-30 2007, 11 pages.
NTT DoCoMo, Inc., R2-063389 Inter-eNB Handover (UP), Nov. 6-10, 2006, Riga, Latvia, TSG-RAN WG2 meeting #56 (5 pages).
Qualcomm Europe Data forwarding with PDCP located in eNB, 3GPP TSG RAN WG2 #57, Feb. 12-16, 2007, St. Louis, Missouri, USA, R2-070850.
Samsung: "R2-061829 Re-use of PDCP SN at ARQ level?", Jun. 27-30, 2006, Cannes, France, 3GPP TSG-RAN2 Meeting #53 BIS, pp. 1-9, XP002491408.
Siemens "3GPP TSG RAN WG3 Meeting #51", R3-060267, Denver, Colorado, U.S., Feb. 13-17, 2006, pp. 1-8.

(56) References Cited

OTHER PUBLICATIONS

TSG-RAN Working Group 2 #55 Data Handling for Handover, R2-062967, Seoul,, Korea, Oct. 9-13, 2006, pp. 1-3.
Universal Mobile Telecommunications System (UMTS); Feasibility Study for Evolved Universal Terrestrial Radio Access (UTRA) and Universal Terrestrial Radio Access Network (UTRAN) (3GPP TR 25.912 Version 7.1.0 Release 7), ETSI Standards, Lis, Sophia Antipolis Cedex, France, No. V7.1.0, Jan. 1, 2006, paged 1-58, XP014035381.
Universal Mobile Telecommunications System (UMTS); Packet Data Convergence protocol (PDCP) specification (3GPP TS 25.323 version 7.4.0 Release 7); ETSI TS 125 323 ETSI Standards, Lis, Sophia Antipolis Cedex, France, vol .3-R2, No. V7.4.0, (Mar. 1, 2007), XP014037918.
US Office Action issued in corresponding U.S. Appl. No. 12/451,166, dated Jul. 31, 2014.
3GPP TA 36.300 V8.1.0 (Jun. 2007) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 106 pages (Jun. 2007).
Ericsson, "Sequence numbers on S1 and X2," 3GPP TSG-RAN WG3 #53bis, R3-061492, Agenda Item 7.2.4, Seoul, Korea, 4 pages (Oct. 10-13, 2006).

Extended European Search Report issued by the European Patent Office for European Application No. 17182454.3 dated Nov. 8, 2017 (11 pages).
Fujitsu, "Handling re-ordering in LTE during Handover," 3GPP TSG RAN WG3 Meeting #55-bis, R3-070681, Agenda Item 7.3, Malta, 3 pages (Mar. 27-31, 2007).
Japanese Notice of Reasons for Refusal issued in Japanese Patent Application No. 2018-152323, dated May 14, 2019, 6 pages.
NEC "Lossless Intra-LTE Handover", 3GPP TSG RAN3#53, R3-0601088, Tallinn, Estonia, Aug. 28-Sep. 1, 2006, 7 pages.
3GPP 3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release x), 3GPP TS 25.xxx V0.0.2 (Jul. 2006), pp. 1-40 (40 pages).
USPTO Non-final Office Action issued in U.S. Appl. No. 15/863,029, dated Mar. 11, 2019, 29 pages.
Nokia "Way Forward for User Plane Data Handling and Ciphering Location", 3GPP TSG-RAN WG2 Meeting #57bis, R2-071590, St. Julian's, Malta, Mar. 26-30, 2007, 5 pages.
Japanese Notice of Reasons for Refusal issued in Japanese Patent Application No. 2018-152323, dated Aug. 20, 2019, 6 pages.

\* cited by examiner

HANDOVER HANDLING

CROSS REFERENCE TO RELATED APPLICATIONS

This application is a continuation of U.S. patent application Ser. No. 14/643,642, filed on Mar. 10, 2015, entitled "HANDOVER HANDLING," which is a continuation of U.S. patent application Ser. No. 13/543,402, filed on Jul. 6, 2012, entitled "HANDOVER HANDLING," which is a continuation of U.S. patent application Ser. No. 12/451,166, filed on Oct. 28, 2009, entitled "HANDOVER HANDLING," now U.S. Pat. No. 9,001,781 which issued on Apr. 7, 2015, which is a national phase application of International Application No. PCT/JP2008/058589 entitled "HANDOVER HANDLING," filed on Apr. 30, 2008, which claims priority to United Kingdom Patent Application No. 0708455.1 filed on May 1, 2007, the disclosures of which are hereby incorporated by reference in their entirety.

TECHNICAL FIELD

The present invention relates to the management of data packets in mobile telecommunications networks, particularly but not exclusively networks operating according to the 3GPP standards or equivalents or derivatives thereof.

BACKGROUND ART

In mobile telecommunications networks, there is a requirement for User Equipment (UE) to handover from one base station to another. In the 3GPP, there has been recently proposed a procedure defined in the control plane (C-plane) for handover (HO) from a source eNodeB (base station) to a target eNodeB. The various acronyms applicable to 3G communications will of course be familiar to those skilled in the art but a glossary is appended for the benefit of lay readers.

Although for efficiency of understanding for those of skill in the art the invention will be described in detail in the context of a 3G system, the principles of handover can be applied to other systems, e.g. other CDMA or wireless in which a mobile device or User Equipment (UE) communicates with one of several other devices (corresponding to eNodeB) with the corresponding elements of the system changed as required.

At the RAN2/RAN3/SA2 joint meeting in St. Louis, the SAE/LTE architectural principles were agreed and the decision was to move the PDCP layer down to the eNodeB (base station). At the following RAN2 meeting in Malta it was decided that the ciphering would be performed at the PDCP layer using PDCP Sequence Numbers. Based on this decision user plane handling during handover needs further consideration and the present application proposes a suitable handover procedure.

DISCLOSURE OF THE INVENTION

According to one aspect, the present invention provides a communication method performed by a node of a telecommunication system, the method comprising:
receiving a sequence of PDCP Service Data Units, SDUs, for transmission to another communication node, such as a mobile device;
appending a sequence number to each PDCP SDU;
storing a copy of the PDCP SDUs with appended sequence number in a PDCP buffer;
ciphering the PDCP SDUs;
passing the ciphered PDCP SDUs with appended sequence numbers to an Outer ARQ entity for segmentation;
segmenting the ciphered PDCP SDUs with appended sequence numbers to generate Outer ARQ segments;
generating and appending a respective Outer ARQ header to each Outer ARQ segment to generate a corresponding Outer ARQ Protocol Data Unit, PDU, which header includes data identifying the position of the Outer ARQ segment within the corresponding PDCP SDU;
sending the generated Outer ARQ PDUs to the other communication node;
receiving acknowledgements for transmitted Outer ARQ PDUs; and
purging each PDCP SDU from the PDCP buffer once acknowledgements have been received for the Outer ARQ PDUs containing the PDCP SDU.

The method may be performed in a source node of the telecommunication system in which the other communication node is a mobile communication device and further comprising receiving a handover response from a target node and in response stopping transmission of data packets to the mobile communication device and forwarding PDCP SDUs with their appended sequence number stored in said PDCP buffer to the target node.

Preferably, the mobile communication device sends a status report to the ARQ entity of the source node, which identifies the sequence number of the last in-sequence PDCP SDU received and of any received out-of-sequence PDCP SDUs. The source node can then use this information to determine which PDCP SDUs stored in the PDCP buffer to send to the target node.

In one embodiment, out-of-sequence PDCP SDUs received from the other communication node are buffered and forwarded to the target node at handover. Before being forwarded to the target node, the uplink PDCP SDUs are marked to differentiate them from downlink PDCP SDUs.

According to another aspect, the invention provides a method of facilitating handover of a mobile communication device from a source node to a target node, the method being performed in the source node and comprising, in response to receiving a handover response from the target node:
stopping the transmission of downlink Outer ARQ PDUs from the source node to the mobile communication device;
transmitting a handover command to said mobile communication device after stopping the transmission of said downlink user data;
receiving a status packet from the mobile communication device, which status packet identifies the last in-sequence PDCP SDU received from the source node and any out-of-sequence PDCP SDUs received from the source node; and
forwarding PDCP SDUs to the target node in dependence upon the identified PDCP SDUs received by the mobile communication device.

The invention also provides a method of facilitating handover of a mobile communication device from a source node to a target node, the method being performed in the target node and comprising, in response to transmitting a handover response to the source node:
receiving forwarded downlink PDCP SDUs from the source node;
receiving forwarded uplink out-of-sequence PDCP SDUs from the source node;
transmitting Outer ARQ PDUs corresponding to the received downlink PDCP SDUs to the mobile communication device;

receiving Outer ARQ PDUs from the mobile communication device and forming from them corresponding PDCP SDUs with sequence numbers; and reordering the received PDCP SDUs and the forwarded PDCP SDUs based on their sequence numbers and forwarding them in sequence to a telecommunication network.

The invention still further provides a method performed by a mobile communication device at handover from a source node to a target node, the method comprising:

receiving a status packet from the source node identifying the last in-sequence uplink PDCP SDUs received by the source node and any out-of-sequence PDCP SDUs received by the source node;

receiving a handover command from the source node;

transmitting a status packet to the source node identifying the last in-sequence downlink PDCP SDU received from the source node and any out-of-sequence PDCP SDUs received from the source node;

stopping transmission of data packets to the source node;

establishing a communication link with the target node;

determining PDCP SDUs to be transmitted/retransmitted to the target node based on the status packet received from the source node; and transmitting/retransmitting the determined PDCP SDUs to the target node.

While the invention is described for ease of understanding in the context of handover from one 3G eNodeB to another, the principles may be extended to handover between nodes of different networks, e.g. a 3G network and another network.

The invention provides, for all methods disclosed, corresponding computer programs or computer program products for execution on corresponding equipment, the equipment itself (user equipment, nodes or components thereof) and methods of updating the equipment.

BEST MODE CARRYING OUT THE INVENTION

Overview

Figure 1:
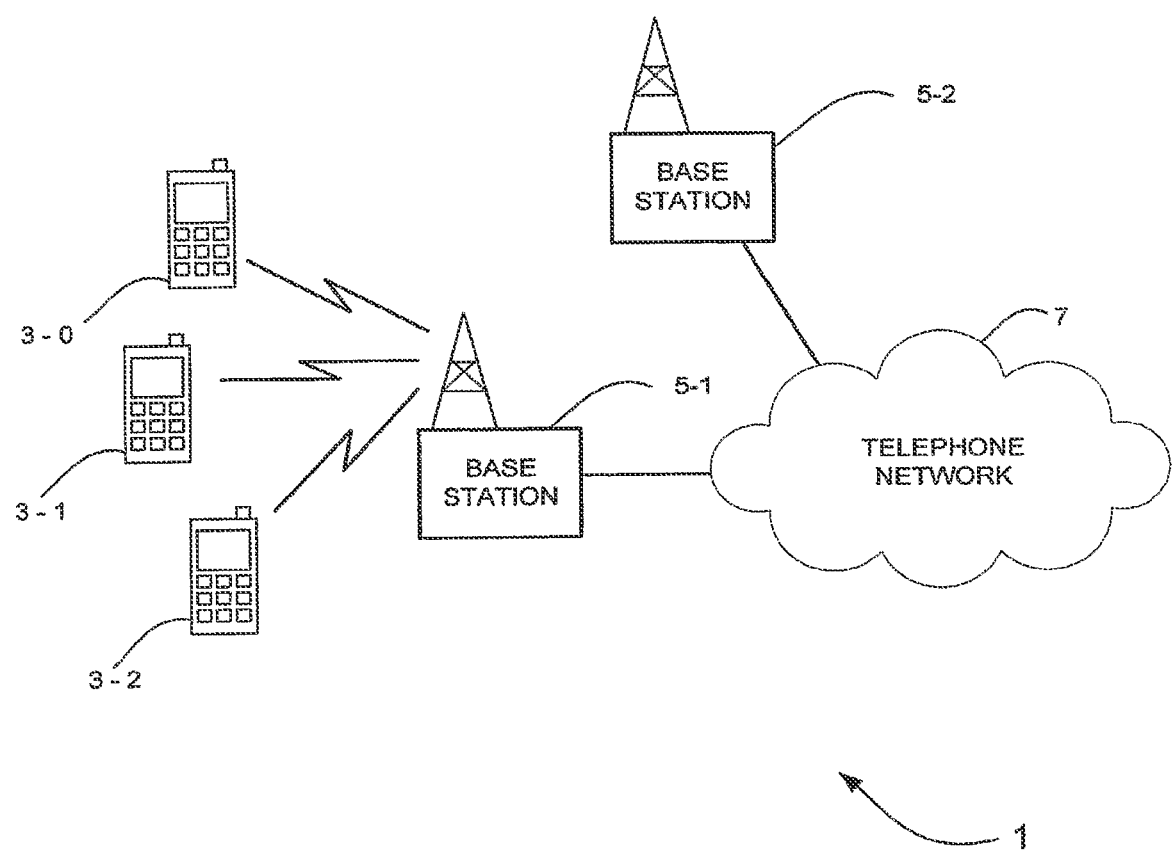
FIG. 1 schematically illustrates a mobile telecommunication system of a type to which the embodiment is applicable.

FIG. 1 schematically illustrates a mobile (cellular) telecommunication system 1 in which users of mobile telephones (MT) 3-0, 3-1, and 3-2 can communicate with other users (not shown) via one of the base stations 5-1 or 5-2 and a telephone network 7. In this embodiment, the base stations 5 use an orthogonal frequency division multiple access (OFDMA) technique in which the data to be transmitted to the mobile telephones 3 is modulated onto a plurality of sub-carriers. Different sub-carriers are allocated to each mobile telephone 3 depending on the amount of data to be sent to the mobile telephone 3. When a mobile telephone 3 moves from the cell of a source base station (eg base station 5-1) to a target base station (eg base station 5-2), a handover (HO) procedure (protocol) is carried out in the source and target base stations 5 and in the mobile telephone 3, to control the handover process.

The handover process aims to provide an optimised hard handover (HHO) between the source and target base stations 5 with the following requirements:

1. Lossless HHO for the non-real time (NRT) Services in order to achieve high TCP throughput performance.
2. Seamless HHO for real time (RT) services to minimise the packet loss in order to have good end to end performance of the application.
3. Minimization of duplicate packet transmission over the air interface.
4. Minimal interruption time for the user plane data.
5. In sequence delivery of NAS (Non Access Stratum) PDUs should be maintained during HO.
6. No duplication and out of sequence delivery should be visible to ROHC (Robust Header Compression) and application.

A hard handover is one where there is a break in radio transmissions between the mobile telephone and the base stations during the handover, as opposed to a soft handover, where the mobile telephone will establish a radio link with both the source and target base stations during the handover procedure. As those skilled in the art will appreciate, it is therefore more difficult to perform a hard handover whilst minimising packet loss and packet retransmission.

Base Station

Figure 2:
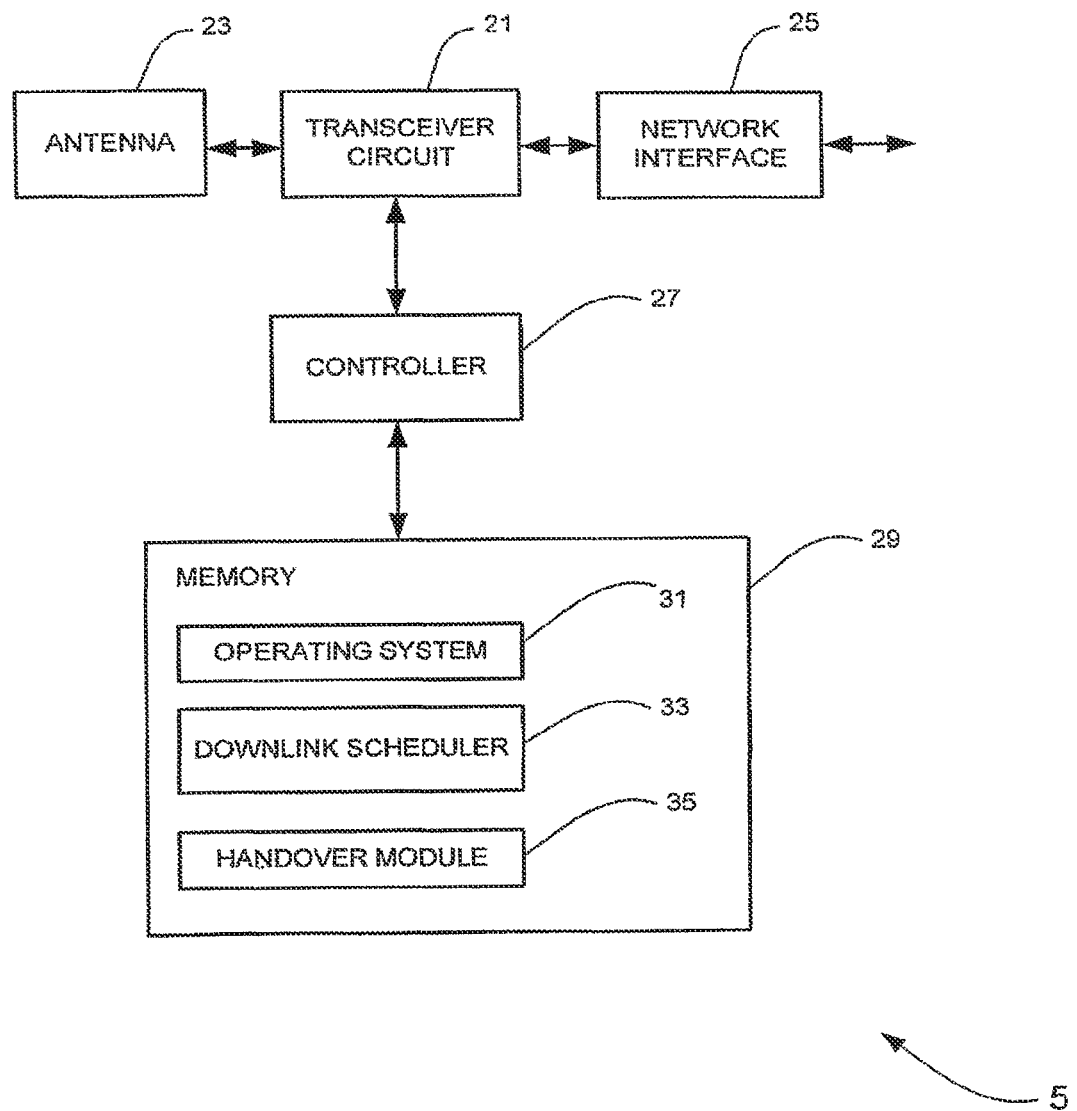
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. A controller 27 controls the operation of the transceiver circuit 21 in accordance with software stored in memory 29. The software includes, among other things, an operating system 31 and a downlink scheduler 33. The downlink scheduler 33 is operable for scheduling user data packets to be transmitted by the transceiver circuit 21 in its communications with the mobile telephones 3. The software also includes a handover module 35, the operation of which will be described below.

Mobile Telephone

Figure 3:
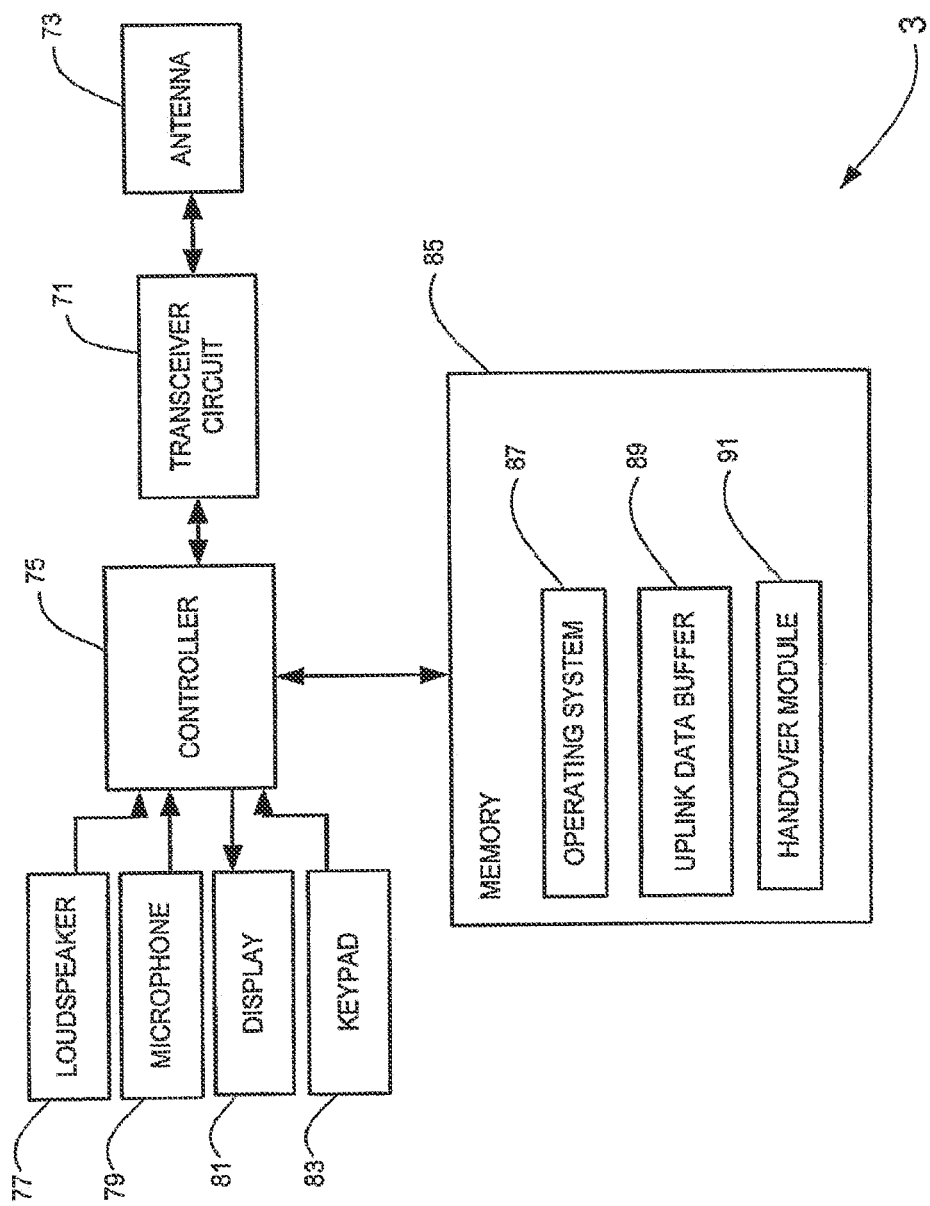
FIG. 3 schematically illustrates a mobile communication device forming part of the system shown in FIG. 1.

FIG. 3 schematically illustrates the main components of each of the mobile telephones 3 shown in FIG. 1. As shown in FIG. 3, the mobile telephones 3 each include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 on one hand and to a loudspeaker 77, a microphone 79, a display 81, and a keypad 83 on the other hand. The controller 75 operates in accordance with software instructions stored within memory 85. As shown, these software instructions include, among other things, an operating system 87. In this embodiment, the memory also provides uplink data buffers 89. The software for controlling the handover process is provided by a handover module 91, the operation of which will be described below.

In the above description, both the base station 5 and the mobile telephones 3 are described for ease of understanding as having respective discrete handover modules which control the handover procedure when a mobile telephone 3 moves from a source base station to a target base station. Whilst the features may be provided in this way for certain applications, for example where an existing system has been modified to implement the invention, in other applications, for example in systems designed with the inventive features in mind from the outset, the handover features may be built into the overall operating system or code and so a handover module as a discrete entity may not be discernible.

Operation

The following description will use the nomenclature used in the Long Term Evolution (LTE) of UTRAN. Therefore, the mobile telephone 3 that is changing base stations will be referred to as UE, the source base station 5-1 will be referred to as the source eNodeB (or simply eNB) and the target base station 5-2 will be referred to as the target eNodeB. The protocol entities used in LTE have the same names as those used in UMTS except for the Radio Link Control (RLC) entities which, under LIE, are called the Outer ARQ entities. The Outer ARQ entities of LTE have substantially the same (although not identical) functionality to the RLC entities of UMTS.

Figure 4:
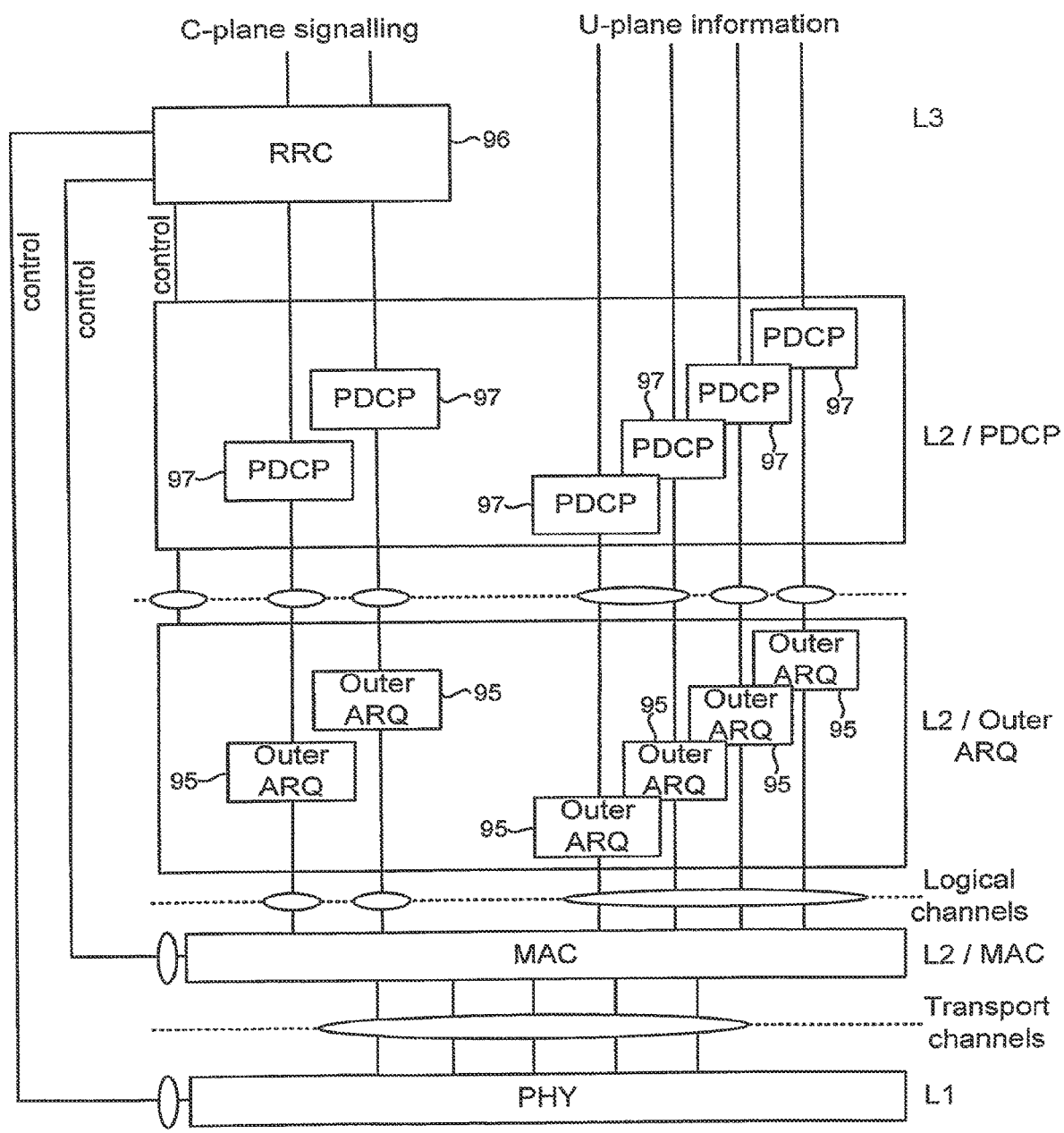
FIG. 4 illustrates part of a protocol stack forming part of the communication software used to control communications between the mobile communication device and the base stations.

FIG. 4 illustrates part of a protocol stack (lower three layers) used in the UE and eNodeBs. The first layer is the physical layer (L1) which is responsible for the actual transmission of the data over the radio communication channel. Above that is the second layer (L2), which is divided into three sub-layers—the Medium Access Control layer (L2/MAC) which is responsible for controlling access to the air interface; the Outer ARQ (Automatic Repeat request) layer (L2/OARQ) which is responsible for concatenation and segmentation of data packets, the acknowledgment of packets and the re-transmission of data packets where necessary; and the PDCP (Packet Data Convergence Protocol) layer (L2/PDCP) which is responsible for header compression and ciphering. Above the second layer is the Radio Resource Control (RRC) layer (L3/RRC) that is responsible for controlling radio resources used in the air interface between the eNodeB and the UE. As shown, the L2/Outer ARQ layer includes a number of Outer ARQ entities 95 used to manage the transmission of C-plane data and U-plane data and the L2/PDCP layer includes PDCP entities 97 used to process the C-plane and the U-plane data.

Figure 5:
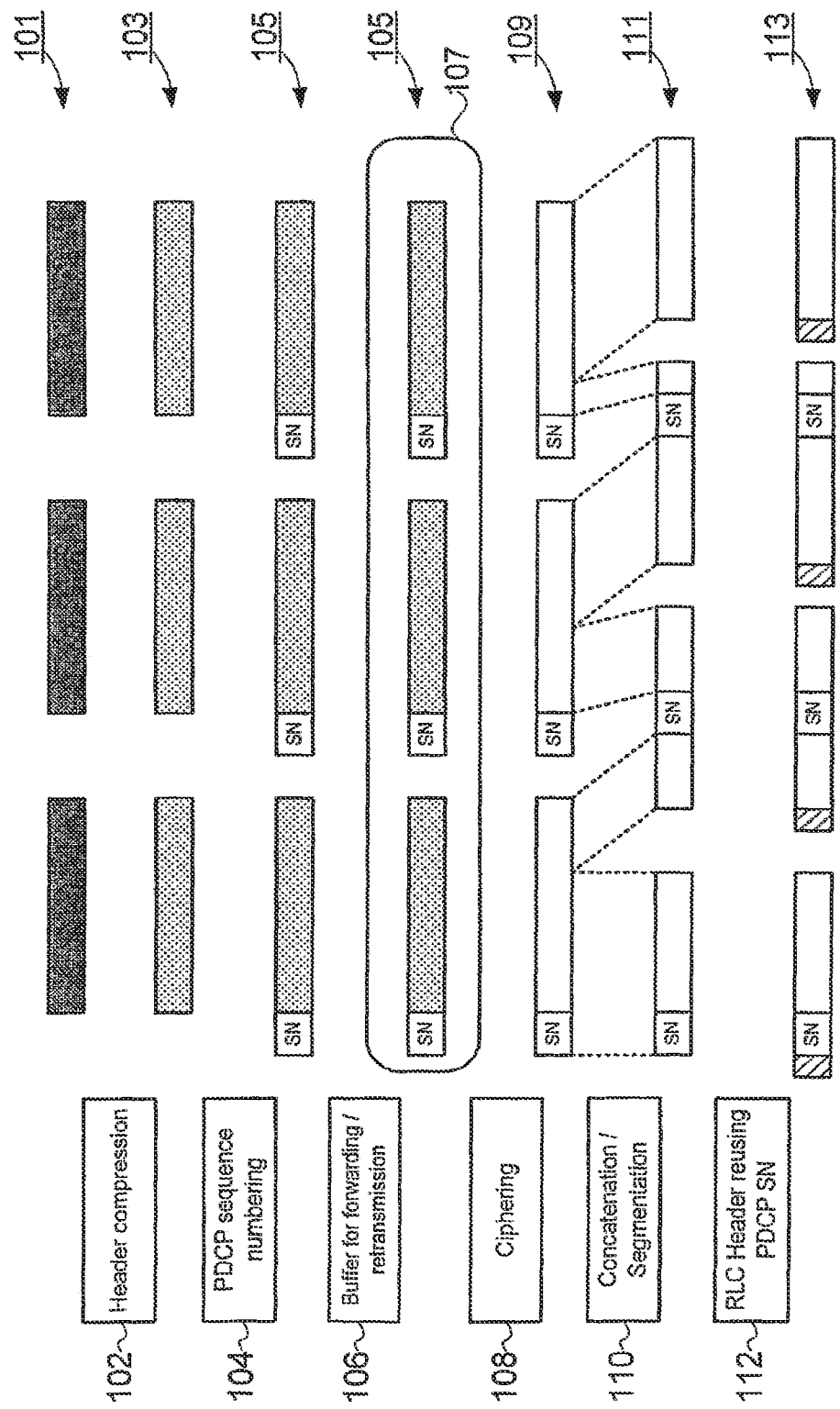
FIG. 5 shows a handover process.

FIG. 5 schematically illustrates the operations performed by the PDCP entities 97 and the Outer ARQ entities 95 when processing downlink data packets. A similar process is performed for uplink data packets, but in the reverse order. As shown, PDCP SDUs (Service Date Units) 101 received by the PDCP entity 97 firstly undergo a header compression 102 to generate corresponding SDUs 103 with compressed headers. The PDCP entity 97 then generates and appends 104 a sequence number (SN) to each SDU 103 identifying the number of the SDU in the sequence of SDUs for the UE. The thus generated SDUs with SNs 105 are then buffered 106 in a PDCP buffer 107. These SDUs are then ciphered 108 to generate the ciphered PDCP PDUs 109, which are passed to the Outer ARQ entity 95, where they are segmented to form Outer ARQ SDU segments 111. Each Outer ARQ SDU segment is then tagged with data identifying the segment and its position within the corresponding PDCP PDU 109. In this embodiment, the Outer ARQ entity 95 reuses the PDCP sequence number (SN) and an OFFSET and LENGTH which indicate the position and length of the Outer ARQ segment in the original PDCP PDU 109.

During normal operation, for downlink AM (Acknowledge Mode) packets, the PDCP entity 97 will purge each PDCP SDU 105 from its buffer 107 as soon as the Outer ARQ entity 95 confirms that it has received acknowledgements for all the Outer ARQ segments 111 that contain the PDCP SDU 105. For downlink UM (Unacknowledged Mode) packets, the PDCP entity 97 deletes each PDCP SDU 105 from its buffer 107 as soon as the Outer ARQ entity 95 acknowledges the transmission of the Outer ARQ PDUs 111 containing the PDCP SDU 105. For uplink AM packets, the outer ARQ entity 95 receives packet segments from the UE and acknowledges receipt. The Outer ARQ entity 95 then concatenates the received packet segments to generate ARQ SDUs which it forwards to the PDCP entity 97. The PDCP entity 97 then deciphers the received ARQ SDUs and if the sequence number is not out of sequence, it removes the SN and decompresses the header before forwarding the packet to an MME/SAE Gateway in the telephone network 7. However, if the received packet is out of sequence, then the PDCP entity 97 stores the received packet in its buffer 107, until all the missing packets have been received at which point the PDCP entity 97 reorders the SDUs based on their PDCP sequence numbers, then removes the SN, decompresses the packet headers and forwards the received packets in correct sequence to the telephone network 7. For uplink UM packets, the Outer ARQ entity 95 receives the packet segments, concatenates them and sends them to the PDCP entity 97. The PDCP entity 97 then deciphers the packets, removes their sequence numbers, decompresses their headers and then forwards them to the telephone network 7.

Description of the Handover protocol

The description that follows mainly applies to acknowledge mode (AM) Radio Link Control (RLC), in which receipt of data packets are acknowledged by the receiver, although the Outer ARQ entity (the equivalent of RLC for LTE) may not be identical to the RLC in all aspects. Specifics of unacknowledged mode (UM) Outer ARQ entities employed for real time applications such as VoIP and streaming are also brought out wherever there is a different handling applied as compared to the acknowledge mode entities.

In order to transfer the context and forward the data to support lossless inter eNodeB handover, we have appreciated that it is desirable that the source eNodeB is able to synchronize the data transmission status between itself and the target eNodeB during handover. From this we have concluded that the data flow should desirably be stopped at an appropriate instant in time during the handover execution phase considering that the interruption time for the User Plane data is minimal. However, fulfilling this desired requirement is not straightforward as stopping the data transmission through additional signalling would be problematic as it would increase the overall handover time. We have appreciated that it is possible implicitly to stop the data transmission in (one or both, preferably both) the source eNodeB and UE at the time of handover execution, by modifying the conventional approach (which is carried out solely in the C-plane) to build in some "realisation" of the handover process in the User plane data transfer process. A further desirable feature is that the number of duplicated packets transmitted over the air either by the target eNodeB or by the UE is minimised.

Figure 6:
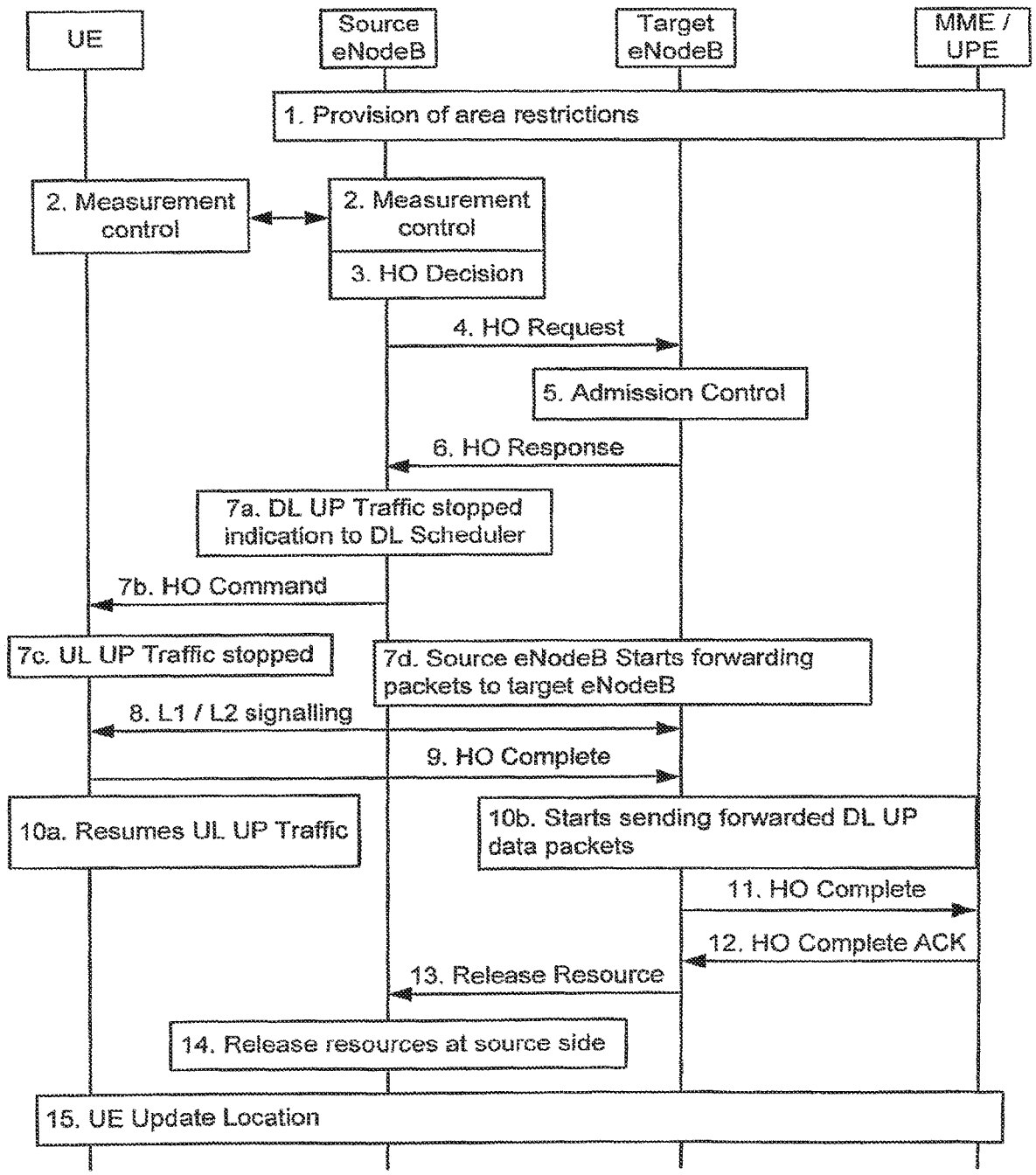
FIG. 6 illustrates the operation of the PDCP and outer ARQ entities for managing the buffering of acknowledge mode data packets.

FIG. 6 shows timings when it is proposed to stop the U-plane data transmission in the Downlink (DL) and the Uplink (UL), together with the details of the modified sequences described. The following description explains how this approach of stopping the data flow facilitates achieving a fast lossless handover for LTE.

Referring to FIG. 6, information flow for Intra-LTE-Access Mobility Support is described.

1) The UE context within the source eNodeB contains information regarding roaming restrictions which were provided either at connection establishment or at the last TA update.
2) The source eNodeB entity configures the UE measurement procedures according to the area restriction information. Measurements provided by the source eNodeB entity may assist the function controlling the UE's connection mobility.
3) Based on measurement results from the UE and the source eNodeB, probably assisted by additional RRM specific information, the source eNodeB decides to handover the UE to a cell controlled by the target eNodeB.
4) The source eNodeB issues a handover Request to the target eNodeB entity passing necessary information to prepare the handover et the target side. The target eNodeB configures the required resources.
5) Admission Control is performed by the target eNodeB to increase the likelihood of a successful handover, if the resources can be granted by target eNodeB.
6) The handover preparation is finished at the target eNodeB, information for the UE to reconfigure the radio path towards the target eNodeB is passed to the source eNodeB.
7) This step consists of the following sub steps.
   a. Before submitting the HO Command to the lower protocol layers, the Radio Resource Control (RRC) entity 96 in the source eNodeB commands the Outer ARQ User Plane (UP) entities 95 to send a status packet in the downlink direction and stop the DL transmission so that these Outer ARQ entities 95 shall not submit any Outer ARQ PDUs to the lower protocol layer. The UL reception should continue. In case receiving packets are UM Outer ARQ PDUs, the Outer ARQ entity will reassemble the SDUs and transfer them to the upper layers as soon as all PDUs that contain the SOU have been received.
   b. The UE is commanded by the source eNodeB RRC entity 96 to perform the HO; target side radio resource information is contained in the command.
   c. On receiving the HO Command the RRC entity 96 in the UE commands the outer ARQ U-plane entities to send a status packet in the Uplink direction and stop the UL transmission. In response, the PDCP layer in the source eNodeB positively purges the corresponding PDCP SDU from its buffer 107. Following this, the UE shall immediately initiate the L1/L2 signalling in the target eNodeB after this.
   d. Since the user plane data transmission is stopped in both directions and the status packet is exchanged in both uplink and downlink, the source eNodeB will be able to accurately synchronize the data transmission status between source and target eNodeBs, and SDU forwarding (from Source eNodeB to target eNodeB) can start from any point after this.
8) The UE gains synchronisation at the target side.
9) Once the UE has successfully accessed the cell, it sends an indication to the target eNodeB that the handover is completed.
10 a) After submitting the handover Complete to the lower layer, the RRC entity 96 in the UE commands the PDCP entities 97 and the Outer ARQ entities 95 to resume the UL U-plane traffic.
10 b) On reception of handover Complete, the RRC entity 96 in the target eNodeB commands the PDCP entities 97 and the Outer ARQ U-plane entities 95 to resume the DL traffic. The target eNodeB starts the transmission of the forwarded DL packets received from the source eNodeB.
11) The MME/UPE is informed that the UE has changed cell. The UPE switches the data path to the target eNodeB and can release any U-plane/TNL resources towards the source eNodeB.
12) The MME/UPE confirms the handover Complete message to the target eNodeB with the handover Complete ACK message.
13) The target eNodeB triggers the release of resources at the source side. The target eNodeB can send this message directly after reception of message 9.
14) Upon reception of the Release Resource message, the source eNodeB releases radio and C-plane related resources in relation to the UE context. The source eNodeB continues to perform data forwarding until an implementation dependent mechanism decides that data forwarding can be stopped and U-plane/TNL resources can be released.
15) If the new cell is a member of a new Tracking Area, the UE needs to register with the MME/UPE which in turn updates the area restriction information on the target eNodeB.

Unidirectional Stopping of the Outer ARQ Entities

Since data transmission is being stopped in the source eNodeB and in the UE at the time of handover execution, it needs to be emphasised that suspending the user plane data transfer in both directions (as in a conventional REL 6 RLC entity) would result in data loss as the data packets in flight will be discarded by the RLC entity that has been stopped. Hence for a LTE system where there will be hard handovers, the outer ARQ entity (RLC) should stop transmissions but continue to receive packets to avoid any data loss.

Packet Forwarding

In this embodiment, the PDCP sequence numbers are maintained during handover (used by the target eNodeB) and the source eNodeB selectively forwards all downlink PDCP SDUs (with SN) 105 (from the buffer 107) that have not been acknowledged by the UE to the target eNodeB, and discards any remaining downlink Outer ARQ PDU segments that have not yet been transmitted. During handover, the source eNodeB also forwards uplink PDCP SDUs 105 successfully received in-sequence to the telephone network 7 (SAE Gateway), forwards uplink PDCP SDUs 105 received out-of-sequence, from the buffer 107, to the target eNodeB and discards any remaining uplink Outer ARQ PDUs. The uplink PDCP SDUs received out-of-sequence need to be marked as Uplink Packets by the PDCP entity 97 before they are forwarded to the target eNodeB PDCP entity 97 so that the target eNodeB can establish that the packet is an out-of-sequence uplink packet and not a downlink packet for transmission to the UE. The target eNodeB PDCP then forwards these out-of-sequence uplink packets to the telephone network 7 once the missing uplink packets have been received from the UE.

Sending STATUS PDU Before Stopping the Outer ARQ Entities

In order to transfer the context and forward the data to support lossless inter eNodeB HO, the source eNodeB synchronizes the data transmission status between itself and the UE with the target eNodeB during HO. This is facilitated by stopping the data flow at an appropriate instant in time during the HO execution phase, considering that the interruption time for the user plane data is minimal. In one embodiment the Outer ARQ entity in the source eNodeB and in the UE sends the other a status report (indicating what that device has received successfully) before stopping the data flow in the appropriate direction. This status message may be a simplified report indicating only what the device has received. This allows the source eNodeB and the UE to get to know the exact data transmission status (ie what the other party has received and therefore what still has to be sent) before stopping the transmission during the HO execution. Therefore, after the HO the data transmission can resume without the need to transmit any duplicated packets over the air interface.

In the preferred embodiment, the Outer ARQ status reports exchanged at the time of handover are based on the Outer ARQ SDUs 109 using the PDCP sequence numbers (SNs), rather than status reports based on the Outer ARQ PDUs 111, as these would have to be larger in size (to include the PDCP SN as well as the OFFSET and LENGTH data which are needed to identify each Outer ARQ PDU 111) and may delay the handover. With PDCP SN based Status Reports, the size of the Status PDU can be reduced to an order of tens of bytes, facilitating fast transmission at the time of handovers. During normal operation, the Outer ARQ entities may exchange status PDUs based on the smaller sized ARQ PDUs. Unlike the status PDUs used during handover, these status PDUs will include the OFFSET and LENGTH data needed to identify the smaller ARQ PDUs.

Advantages

The precise timings that are indicated above for stopping the data flow help in meeting the following (separate) desiderata we have formulated.

I. Unified Lossless handover mechanism for both real-time and non real-time services II. Minimal interruption time for the user plane data.

III. Minimising transmission of duplicate packets by eNodeB and UE.

Desideratum I is met by having PDCP entities 97 which are capable of buffering and forwarding the DL data packets from source to target eNodeB. In the UE the PDCP entities 97 may buffer the data packets generated by the application after the UL transmission is stopped until the UE is switched to the target eNodeB—this requires the UE to provide buffering not present in a conventional UE, but this may not be unduly problematic to implement. By implicitly stopping the data flows the source eNodeB can synchronize the data transmission status between source and target eNodeB. This is because the source eNodeB can know accurately which are the PDCP SDUs that need to be transferred to the target eNodeB based on the data in the transmission and retransmission buffer.

Regarding the desideratum since there is no explicit (additional) signalling involved for stopping the data flow in the UL as well as the DL directions, there will be no increase in the interruption time for the user plane data.

Furthermore, the instance when the DL data is stopped is chosen to be most optimal according to our considerations so as to have minimum interruption time. If the source eNodeB continues to schedule DL data, the UE will not be able to successfully receive or acknowledge these data packets as, immediately after receiving the handover command, it would try to synchronise with the target cell. Eventually these packets would have to be forwarded to the target eNodeB and will have to be transmitted again through the target eNodeB resulting in inefficient usage of the air interface bandwidth. Whilst according to conventional thinking it might be argued that for real-time services such as VoIP, stopping the data would be detrimental to the service, we have appreciated that if the source eNodeB continues to transmit DL packets there is no mechanism by which they could be recovered if the UE could not receive them while it is trying to synchronise with the target cell and this might, in practice, be at least as problematic. However we have appreciated that if the data flow is stopped and a packet forwarding mechanism is adopted, there is a possibility to eliminate packet loss in the DL, although there could be a delayed data packet delivery to the UE which could result in just a single packet being discarded in the worst case. But this could be compensated through the play-out buffer.

Similarly if the UE continues to transmit in the UL while trying to gain synchronisation with the target cell, it may not be able to receive acknowledgements from the source eNodeB and the UE would have to again transmit these AM packets in the UL direction to the target eNodeB resulting in inefficient usage of the air interface bandwidth. For real time (RT) services, packets that are transmitted in the UL direction by the UE while it is trying to gain synchronisation in the target eNodeB, may get lost due to bad radio conditions in the UL and could not be recovered if the data flow is not stopped. Hence it would be beneficial to avoid any packet loss even for real time services in the UL by stopping the UL data flow during handover execution while the delay could be compensated at the receiving end by the play out buffer.

Furthermore if the transmission of data continues both in the UL and DL directions after the handover Command is sent by the source eNodeB, it would be complicated to synchronize the data transmission status between source and target eNodeBs because of the dynamic nature of the packets in the transmission and retransmission buffers at the source eNodeB and would result in duplicated packets being transmitted again by the target eNodeB in the DL and by the UE in the UL to ensure lossless handover for non-real time (NRT) Services result in inefficient usage of the air interface bandwidth. However, for reel-time services such as VoIP etc using UM mode, data packets transmitted by the source eNodeB and not received correctly at the target eNodeB, will be lost and cannot be recovered. Hence stopping the data flow for both RT and NRT services in a unified way will help in better resource utilization on the air interface for the NRT Bearers and will avoid data loss for RT services.

Another advantage of having a definitive time instant for stopping the data flow is that a simplified implicit reordering of the data packets in the target eNodeB can be achieved if the forwarded DL data packets from the source eNodeB on the X2 interface are transmitted first to the UE followed by the data received from the telephone network 7 (MME/SAE Gateway on the S1 interface).

From the above discussion it seems desirable to stop the UL and DL data transmission during the handover execution for both RT and NRT Services to support lossless Inter eNodeB handover, while aiming to keep the interruption time and transmission of duplicate packets to a minimum.

Glossary of 3GPP terms

LTE—Long Term Evolution (of UTRAN)
eNodeB—E-UTRAN Node B
AGW—Access Gateway
UE—User Equipment—mobile communication device
DL—downlink—link from base to mobile
UL—uplink—link from mobile to base
AM—Acknowledge Mode
UM—Unacknowledged Mode
MME—Mobility Management Entity
UPE—User Plane Entity
HO—Handover RLC—Radio Link Control
RRC—Radio Resource Control
RRM—Radio Resource Management
SDU—Service Data Unit
PDU—Protocol Data Unit
NAS—Non Access Stratum
ROHC—Robust Header Compression
TA—Tracking Area
U-plane—User Plane
TNL—Transport Network Layer
S1 Interface—Interface between Access Gateway and eNodeB
X2 Interface—Interface between two eNodeB MMEs/SAE Gateway—New name for Access Gateway having both MME and UPE entities The following is a detailed description of the way in which the present inventions may be implemented in the currently proposed 3GPP LIE standard. Whilst various features are described as being essential or necessary, this may only be the case for the proposed 3GPP LTE standard, for example due to other requirements imposed by the standard. These statements should not, therefore, be construed as limiting the present invention in any way.

This application is based upon and claims the benefit of priority from UK patent application No. 0708455.1, filed on May 1, 2007, the disclosure of which is incorporated herein in its entirety by reference.

REFERENCES

[1] R2-062754, "PDCP/RLC/MAC PDU structure", Nokia
[2] R2-062800, "Sequence Numbering & Reuse of PDCP SN", InterDigital
[3] R2-063389, Inter-eNB Handover (UP), NTT DoCoMo

The invention claimed is:

1. A method performed by a source node which communicates with a target node, the method comprising:
   receiving uplink Packet Data Convergence Protocol (PDCP) Service Data Units (SDUs);
   transmitting, to the target node, a handover request;
   receiving, from the target node, a handover response;
   providing, to the target node, a status message, wherein the status message is configurable to include information for identifying at least a PDCP Sequence Number (SN) of a first missing uplink PDCP SDU; and
   forwarding, to the target node, out-of-sequence uplink PDCP SDUs after sending the status message, wherein each forwarded uplink PDCP SDU is a data unit formed by processing at least one PDCP Protocol Data Unit (PDU) received at a PDCP entity.

2. The method according to claim 1, wherein the method further comprises forwarding, to a gateway, uplink PDCP SDUs successfully received in-sequence upon handover.

3. The method according to claim 1, wherein the out-of-sequence uplink PDCP SDUs are forwarded in case RLC Acknowledge Mode (AM) is applied.

4. The method according to claim 1, wherein the handover response is transmitted, by the target node, in response to the handover request.

5. The method according to claim 1, wherein the method further comprises transmitting, to a mobile station, a handover command after receiving the handover response.

6. The method according to claim 1, wherein each PDCP SDU of the uplink PDCP SDUs comprises at least one RLC PDU.

7. The method according to claim 1, wherein the source node is a source base station and the target node is a target base station.

8. The method according to claim 1, wherein the status message is configurable to include further information for identifying out-of-sequence PDCP SDUs that need to be transmitted in a target cell.

9. A source node which communicates with a target node, the source node comprising:
   a transceiver configured to:
      receive uplink Packet Data Convergence Protocol (PDCP) Service Data Units (SDUs);
      transmit, to the target node, a handover request;
      receive, from the target node, a handover response;
      provide, to the target node, a status message, wherein the status message is configurable to include information for identifying at least a PDCP Sequence Number (SN) of a first missing uplink PDCP SDU; and
      forward, to the target node, out-of-sequence uplink PDCP SDUs after sending the status message, wherein each forwarded uplink PDCP SDU is a data unit formed by processing at least one PDCP Protocol Data Unit (PDU) received at a PDCP entity.

10. The source node according to claim 9, wherein the transceiver is further configured to forward, to a gateway, uplink PDCP SDUs successfully received in-sequence upon handover.

11. The source node according to claim 9, wherein the out-of-sequence uplink PDCP SDUs are forwarded in case RLC Acknowledge Mode (AM) is applied.

12. The source node according to claim 9, wherein the handover response is transmitted, by the target node, in response to the handover request.

13. The source node according to claim 9, wherein the transceiver is further configured to transmit, to a mobile station, a handover command after receiving the handover response.

14. The source node according to claim 9, wherein each PDCP SDU of the uplink PDCP SDUs comprises at least one RLC PDU.

15. The source node according to claim 9, wherein the source node is a source base station and the target node is a target base station.

16. The source node according to claim 9, wherein the status message is configurable to include further information for identifying out-of-sequence PDCP SDUs that need to be transmitted in a target cell.

* * * * *